Nov. 29, 1927.
J. O. GOLDEN
1,651,346
STERILIZING APPARATUS
Filed Dec. 20, 1926
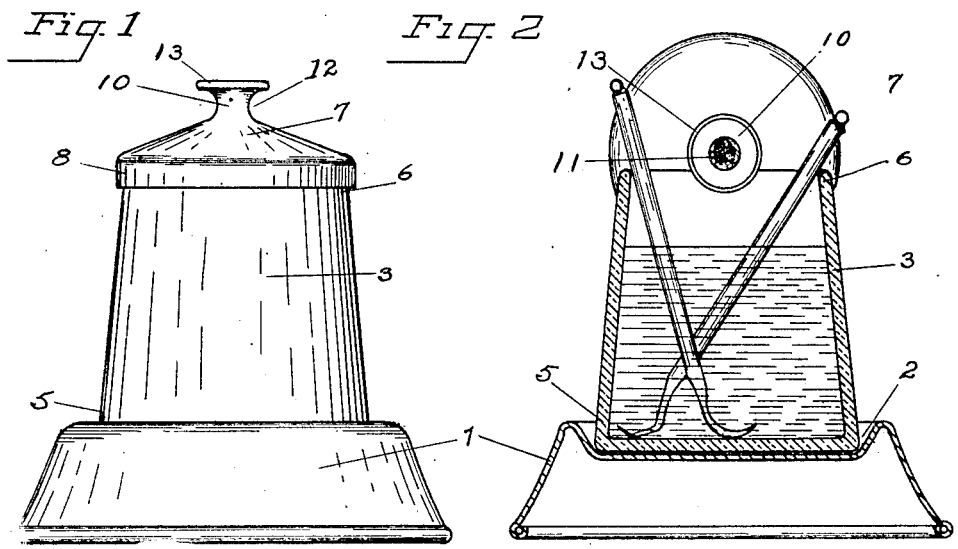
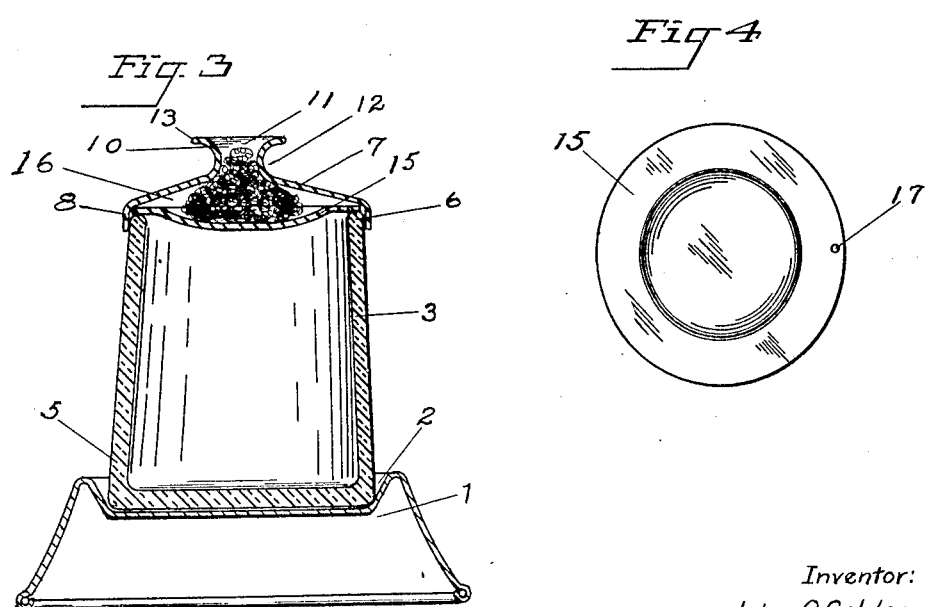
Inventor:
John O. Golden
By his Attorney: Horace Barnes Patented Nov. 29, 1927.

1,651,346

UNITED STATES PATENT OFFICE.

JOHN O. GOLDEN, OF PORTLAND, OREGON.

STERILIZING APPARATUS.

Application filed December 20, 1926. Serial No. 155,856.

The object of my invention is to provide apparatus of simple and compact construction and attractive appearance for the sterilization of dental instruments, barbers' tools, and the like, through the submersion of the instruments in a cold sterilizing solution contained within the apparatus.

A further object of the invention is the provision of a containing jar for the sterilizing solution and a lid or removable cover therefor containing an openable compartment for the reception of aseptic cotton, said lid being provided with a knob communicating with said compartment through which the cotton may be withdrawn by the operator as needed.

Other objects and advantages of my invention, and objects relating to details thereof and novel arrangement of parts, will be readily apparent in the course of the detailed description to follow.

The accompanying views illustrate by way of example a preferred embodiment of my invention, in which:

Figure 1 is a view in side elevation of my improved sterilizing apparatus.

Fig. 2 is a view in vertical section of the same as it will appear when employed in sterilizing instruments, the lid thereof being shown in side elevation and supported on the jar.

Fig. 3 is a view in vertical section of the same with the lid in covered position on the jar.

Fig. 4 is an under side plan view of the plate element of the lid.

Referring to said views, the reference numeral 1 indicates a circular metal base of any preferred design having a circular recess 2 in its upper wall to receive a circular jar 3 and support the same against displacement and to receive any drip of liquid accidentally spilled on the outer walls of said jar. The jar 3 is preferably made of amber glass to largely prevent the deterioration of the sterilizing solution contained therein through the action of light rays. The bottom wall 5 is slightly larger in diameter than the upper marginal edge 6 thereof. Said jar is intended to contain a sterilizing solution for the cold sterilization of dental instruments, barbers' razors, scissors, combs, and other tools, as illustrated in Fig. 2.

A removable cover or lid is provided for said jar comprising a concavo-convex upper wall 7 having its concave face disposed upwardly and formed with an annular flange 8 about its perimeter depending vertically over the upper marginal edge of the jar upon which the cover rests when in covering position. The wall 7 is formed with a centrally disposed integral knob 10 of tubular form affording an axially arranged circular opening 11. An annular groove 12 is formed exteriorly of said knob terminating at the extremity thereof in a rolled lip 13 by which the lid may be suspended upon the side of the jar when the lid is uncovered therefrom.

Within the convexity of the lid a concavo-convex plate 15 is removably secured having its inner or concave side opposed to the lower concave side of the wall 7 providing a compartment 16 therebetween for the reception of a pad of aseptic or surgical cotton. The plate 15 may be sprung into place within the under side of the lid and be retained therein by its pressure upon the overhanging flange 8 and may be readily removed therefrom through the insertion of a sharp instrument into a hole 17 adjacent the marginal edge of the plate through which it may be readily pried out, for the purpose of refilling the compartment 16 with cotton. The plate 15 may be fixedly secured in place and the cotton supply may be inserted into the compartment 16 through the opening 11.

The apparatus described affords a self-sufficient sterilizing unit for dentists, barbers, or for other analogous uses, wherein efficient sterilization of instruments may be quickly and neatly performed without loss of time or material risk of soiling or staining the table or shelf upon which it may be mounted. The ends of the tools or instruments are submerged in the sterilizing solution, as indicated in Fig. 3, for about one minute, and then when rinsed in hot water are ready for use in an aseptic condition.

The lid is previously uncovered from the jar and preferably supported on the farther edge 6 thereof through the engagement of the annular groove 12 of the knob therewith, whereupon the tubular opening 11 will face the operator in a convenient position with a supply of cotton presented to the opening. In the case of an abrasion or cut upon the patient or customer where an application of a sterilizing agent is desirable, the operator will insert a pair of tweezers within the opening 11 and draw therefrom a small portion of cotton and saturate it with the sterilizing solution within the jar, whereupon it may be applied to the abrasion or cut with efficient results.

The apparatus is attractive in design, convenient and efficient in use, and thoroughly adapted for the purposes intended.

From the foregoing description, taken in connection with the accompanying drawings, the advantages of the construction and application of my improved sterilization apparatus will be readily apparent; but, while I have described the principle of operation of the invention, together with the devices which I now consider the best embodiment thereof, it will be understood that the structures shown are merely illustrative, and that such changes may be made therein as will lie within the scope of the following claims.

Having described my invention, what I claim, is:

1. A sterilizing unit, comprising a base having a jar-receiving recess therein, a jar formed with sides sloping inwardly from its bottom received in said recess, a lid for said jar formed with a concavo-convex wall overlying said jar having a depending annular flange extending over the marginal edge of the jar, a plate removably secured upon the under side of said lid of concavo-convex form, its concavity being oppositely disposed relatively of that of the lid to form a containing compartment for cotton, and a tubular knob on said lid affording access to said compartment having an annular groove by which said lid may be suspended from said marginal edge of the jar.

2. A sterilizing unit, comprising a base having a jar-receiving recess therein, a jar, a lid for said jar formed with a concavo-convex wall overlying said jar having a depending annular flange extending over the marginal edge of the jar, a plate removably secured upon the under side of said lid of concavo-convex form, its concavity being oppositely disposed relatively of that of the lid to form a containing compartment for cotton, and a tubular knob on said lid affording access to said compartment having an annular groove by which said lid may be suspended from said marginal edge of the jar.

3. A sterilizing unit, comprising a base having a jar-receiving recess therein, a jar, a lid for said jar formed with a concavo-convex wall overlying said jar having a depending annular flange extending over the marginal edge of the jar, a plate secured upon the under side of said lid of concavo-convex form, its concavity being oppositely disposed relatively of that of the lid to form a containing compartment for cotton, and a tubular knob on said lid affording access to said compartment having an annular groove by which said lid may be suspended from said marginal edge of the jar.

4. Sterilizing apparatus, comprising a jar, a lid therefor of concavo-convex shape having a centrally disposed knob of tubular form, and a concavo-convex plate removably secured to the under side of said lid arranged with its concavity in opposite relation to that of said lid to form a compartment to which access is obtained through said knob, said knob having an annular groove thereabout through which the lid may be suspended from said jar.

5. Sterilizing apparatus, comprising a jar, a lid therefor of concavo-convex shape having a centrally disposed knob of tubular form, and a concavo-convex plate secured to the under side of said lid arranged with its concavity in opposite relation to that of said lid to form a compartment to which access is obtained through said knob, said knob having an annular groove thereabout through which the lid may be suspended from said jar.

6. Sterilizing apparatus, comprising a jar, a lid therefor of concavo-convex shape having a centrally disposed knob of tubular form, a plate secured to the under side of said lid to form a compartment to which access is obtained through said knob, said knob having an annular groove thereabout through which the lid may be suspended from the jar.

JOHN O. GOLDEN.